(12) United States Patent
Yule et al.

(10) Patent No.: US 7,898,579 B2
(45) Date of Patent: **\*Mar. 1, 2011**

(54) METHOD OF POSITION STAMPING A PHOTO OR VIDEO CLIP TAKEN WITH A DIGITAL CAMERA

(75) Inventors: Andrew T. Yule, East Grinstead (GB); Christopher B. Marshall, Haywards Heath (GB); Simon R. Turner, Redhill (GB)

(73) Assignee: U-Blox AG, Thalwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,298

(22) Filed: Sep. 10, 2009

(65) Prior Publication Data

US 2010/0002097 A1 Jan. 7, 2010

Related U.S. Application Data

(63) Continuation of application No. 10/552,049, filed as application No. PCT/IB2004/001000 on Mar. 30, 2004, now Pat. No. 7,619,662.

(30) Foreign Application Priority Data

Apr. 8, 2003 (GB) ................................. 0308054.6

(51) Int. Cl.
*H04N 5/76* (2006.01)
(52) U.S. Cl. .................................................. 348/231.3
(58) Field of Classification Search ........................ None
See application file for complete search history.

(56) References Cited

U.S. PATENT DOCUMENTS

| | | | |
|---|---|---|---|
| 5,379,224 A | | 1/1995 | Brown et al. |
| 5,642,285 A | | 6/1997 | Woo et al. |
| 5,764,770 A | * | 6/1998 | Schipper et al. ............. 713/176 |
| 5,768,640 A | * | 6/1998 | Takahashi et al. ........... 396/310 |
| 5,913,078 A | * | 6/1999 | Kimura et al. ................ 396/50 |
| 6,269,446 B1 | | 7/2001 | Schumacher et al. |
| 6,507,371 B1 | * | 1/2003 | Hashimoto et al. .......... 348/552 |
| 6,741,864 B2 | * | 5/2004 | Wilcock et al. .......... 455/456.1 |
| 6,833,865 B1 | * | 12/2004 | Fuller et al. .............. 348/231.2 |

(Continued)

FOREIGN PATENT DOCUMENTS

EP 1 189 021 A1 3/2002

(Continued)

OTHER PUBLICATIONS

Brown, Alison K., "High Accuracy Targeting Using A GPS-Aided Intertial Measurement Unit," presented and published Jun. 1998, at the ION 54th Annual Meeting, Denver, CO.

(Continued)

*Primary Examiner*—Justin P Misleh
(74) *Attorney, Agent, or Firm*—Blakely, Sokoloff, Taylor & Zafman

(57) ABSTRACT

A method of appending a position stamp to an image file of a photo or video clip taken with a digital camera having a GPS antenna and a GPS RF front-end including an analogue to digital converter for receiving GPS signals and outputting GPS signal samples together with a digital camera and computer for the same.

4 Claims, 1 Drawing Sheet

U.S. PATENT DOCUMENTS

| | | | |
|---|---|---|---|
| 6,914,626 B2 * | 7/2005 | Squibbs | 348/231.3 |
| 6,995,792 B1 | 2/2006 | Ogura | |
| 7,007,243 B2 * | 2/2006 | Baldino | 715/853 |
| 7,145,695 B2 * | 12/2006 | Endo et al. | 358/2.1 |
| 2002/0047798 A1 * | 4/2002 | Platt | 342/357.12 |

FOREIGN PATENT DOCUMENTS

| | | |
|---|---|---|
| JP | 08154228 A | 6/1996 |
| JP | 09163276 | 6/1997 |
| JP | 10063181 A | 3/1998 |

OTHER PUBLICATIONS

Brown, Alison, "Benefits of Software GPS Receivers for Enhanced Signal Processing," published Summer 2000, in GPS Solutions 4(1), pp. 56-66.

Brown, Peter, "Tracktag - A Low-Weight, Long-Duration GPS Recording Device," presented and published Apr. 2001, at the Proceedings of Royal Institute of Navigation RIN0I Conf. on Animal Navigation, Oxford, UK.

* cited by examiner

METHOD OF POSITION STAMPING A PHOTO OR VIDEO CLIP TAKEN WITH A DIGITAL CAMERA

CROSS-REFERENCE TO RELATED APPLICATIONS

The present patent application is a continuation of application Ser. No. 10/552,049, filed Oct. 4, 2005, which issued as U.S. Pat. No. 7,619,662 B2, on Nov. 17, 2009, and which is a national phase application of PCT/IB2004/001000, filed Mar. 30, 2004.

BACKGROUND OF THE INVENTION

1. Field of the Invention

This invention relates to a method of appending a position stamp to an image file of a photo or video clip taken with a digital camera having a GPS antenna and a GPS RF front-end including an analogue to digital converter for receiving GPS signals and outputting GPS signal samples; and to a digital camera and computer for the same.

2. Description of Related Art

It is known to provide a digital camera having a GPS receiver wherein image files generated by the digital camera are annotated or labelled with data identifying the position of the camera at the time of capture as determined by the GPS receiver. For example, see U.S. Pat. No. 6,269,446 or European patent application EP1189021A1.

BRIEF SUMMARY OF THE INVENTION

In accordance with the present invention, there is provided a method of the aforementioned type comprising the steps of (i) upon a user talking a photo or video clip: (a) creating an image file containing that photo or video clip, and (b) sampling received GPS signals and storing those GPS signal samples, e.g. in a file format, with an indication of the image file of the photo or video clip to which those GPS signal samples pertain; and (ii) subsequently processing the GPS signal samples to obtain a position fix and appending the position fix to the image file.

The inventors have realised that storing GPS signal samples with an indication of the image file of the photo or video clip to which those GPS signal samples pertain enables those GPS signal samples to be processed at leisure to determine a position fix and, thereafter, append a position stamp to the image file. For example, they may be processed after an intentional delay has elapsed; after the image file and GPS signal samples have been uploaded to an external computer; or upon detecting the connection to the camera of an external power source (either automatically or after user confirmation of an automatic prompt for the same).

In particular, step (i) may be performed twice upon a user taking respective first and second photo or video clips, prior to step (ii) being done for the first photo or video clip.

BRIEF DESCRIPTION OF THE DRAWINGS

The present invention will now be described, by way of example only, with reference to the accompanying FIGURE which shows, schematically, a PC connected to a digital camera including GPS receiver device, both operating in accordance with the present invention.

DETAILED DESCRIPTION OF THE INVENTION

Figure 1:
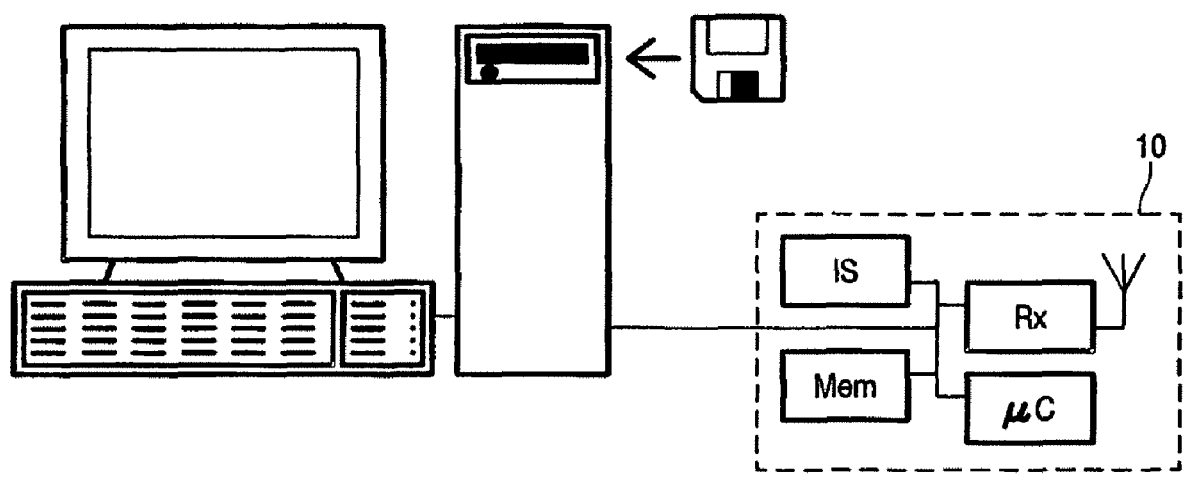

Referring to the accompanying FIGURE, the PC is connected via a USB PC port and corresponding cable to a digital camera 10 which comprises a GPS front-end receiver (Rx) connected to a GPS antenna, an image sensor (IS) and memory (Mem), all under the control of a micro-controller μC.

When operative, the GPS receiver receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The IF signal remains modulated, still containing all the information from the available satellites. The resultant GPS signal samples are then stored in the memory (Mem).

In accordance with the present invention, the digital camera and PC may generate a position stamped image file as illustrated in any of the following example scenarios:

Example 1

Upon a user in possession of the camera taking a photo, an image file containing that photo is created and stored in the memory. At the same time, the GPS receiver receives and samples GPS signals and stores the resultant GPS signal samples in a data file format in the memory together with an indication of the image file to which the GPS signal samples pertain.

Once the user returns home and connects the digital camera to the user's home PC, the image file and corresponding GPS signal samples are uploaded to the PC. The GPS signal samples are then processed using appropriate PC based GPS signal processing software and the PCs more powerful processor to recover pseudorange information from which the position of the digital camera when the corresponding photo was taken can be determined using conventional navigation algorithms. Such GPS signal acquisition and pseudorange processing is well known, for example, see GPS Principles and Applications (Editor, Kaplan) ISBN 0-89006-793-7 Artech House. The position fix is then appended the image file.

Example 2

As example 1 except that two or more photos are taken with corresponding image files and GPS signal samples recorded prior to connection with the PC. Upon connection, both sets of GPS signal samples are processed and the position fixes obtained appended to respective image files.

Example 3

Instead of the GPS signal processing software being PC based, it may be camera based whereby GPS signal samples are processed only after an intentional delay has elapsed after the image file has been created and the GPS signal samples stored. For example, one might post process the GPS signal samples in slow time, thereby minimising processor power consumption. Similarly, the GPS signal samples might be processed only after detecting the connection of the camera to an external power source.

Whilst the invention has been described in the context of NAVSTAR GPS, the all weather, spaced based navigation system developed and currently operated by the U.S. Department of Defense, it will be appreciated that the invention is equally applicable to other global positioning systems including GLONASS and Galileo and hybrids thereof.

Finally, from a reading of the present disclosure, other modifications will be apparent to persons skilled in the arts of GPS and digital cameras which may involve features which are already known in the design, manufacture and use of GPS receivers, digital cameras and component parts thereof and which may be used instead of or in addition to features already described herein.

What is claimed is:

1. A digital camera comprising:
   a GPS antenna; and
   a GPS RF front-end including an analogue to digital converter for receiving GPS signals;
   said digital camera being configured so that upon a user taking a photo or video clip:
   (a) an image file is created containing that photo or video clip and
   (b) wherein the analogue to digital converter is configured to receive and sample the GPS signals and output the GPS signal samples which are stored with an indication of the created image file to which said GPS signal samples pertain,
   and the stored GPS signal samples are for being subsequently processed to obtain a position fix.

2. A digital camera according to claim 1 configured to upload the image file and GPS signal samples to an external computer.

3. A digital camera according to claim 2 configured to allow said image file creation and said GPS signal sample storing to be performed twice upon a user taking respective first and second photo or video clips prior to uploading the image files and GPS signal samples to an external computer.

4. A digital camera according to claim 1 wherein the GPS signal samples are stored in a file format.

* * * * *